United States Patent [19]
Gibson

[11] Patent Number: 4,593,972
[45] Date of Patent: Jun. 10, 1986

[54] CONNECTOR FOR OPTICAL FIBERS
[76] Inventor: Lloyd H. Gibson, Rte. 2, Box 109N, Espanola, N. Mex. 87532
[21] Appl. No.: 596,240
[22] Filed: Apr. 2, 1984
[51] Int. Cl.⁴ .............................................. G02B 6/38
[52] U.S. Cl. .................................................. 350/96.21
[58] Field of Search ................ 350/96.20, 96.21, 96.22

[56] References Cited
U.S. PATENT DOCUMENTS

| 4,135,782 | 1/1979 | Beauhaire | 350/96.21 |
| 4,148,559 | 4/1979 | Gauthier | 350/96.21 |
| 4,208,095 | 6/1980 | Malsot | 350/96.21 |

FOREIGN PATENT DOCUMENTS 0139675  1/1980  German Democratic Rep. ................... 350/96.21

Primary Examiner—John Lee
Attorney, Agent, or Firm—James W. Wright

[57] ABSTRACT

A connector for detachably joining the ends of a pair of optical fibers is described that utilizes a unitary V-form groove for coaxial alignment of the fibers to be joined. The fibers can be assembled into the connector one at a time. Positive means are provided to insure positioning of the fibers in end-to-end relation.

9 Claims, 3 Drawing Figures (Enlarged)

CONNECTOR FOR OPTICAL FIBERS

This invention relates to a connector for connecting optical fibers in abutting and coaxial alignment to facilitate optical signal transmission with low attenuation.

To form a low attenuation connection between optical fibers, geometrical alignment of the fibers at the point of juncture in end-to-end relation is essential. Various approaches have heretofore been employed for geometrical alignment and interconnection of optical fibers. Many of these approaches have utilized a V-form groove to receive the fibers to be joined. The fibers are received in the V-form groove with ends in abutting relation. After proper positioning of the fibers, a clamping pressure is imposed pressing the fibers toward the apex of the groove and against the walls of the V-form groove. An adhesive having a refractive index that matches with the fibers can be used to complete the interconnection of the fibers, if desired.

Several examples of connectors for optical fibers utilizing the principle of the V-form groove are disclosed in Gauthier, U.S. Pat. No. 4,148,559 and Malsot, U.S. Pat. No. 4,208,095. In the Gauthier patent, separate, and identical connection elements are employed for the respective fibers to be joined. Each connection element includes a V-form groove with spaced portions disposed at an angle to each other such that a biasing stress is created on the fiber to hold the fiber end portion to be joined in the V-form groove. With the fibers properly positioned in the connection elements, the elements are assembled together in a staircase configuration such that the portions of the connection elements carrying the fiber end portions to be joined are disposed in superimposing relation with the fibers being received in the V-form groove of each connection element and in end-to-end relation.

Such a connector requires accurate machining of identical V-form grooves in the respective connection elements, precise longitudinal positioning of the fibers within the respective connection elements and accurate positioning and maintenance of the connection elements in relation to each other. The fibers in the connection elements must be held in place while the connection elements are assembled together.

In Malsot, U.S. Pat. No. 4,208,095, a connector is provided comprising two positioning sleeves, means for coaxially aligning the sleeves, and a rod having a longitudinal V-form groove therein for receiving the fibers in coaxial alignment. The rod joins in bridge-fashion the two sleeves with the V-form groove facing mating surfaces of the two sleeves. The rod is resiliently held against the sleeves to maintain interconnection of the assembly and the fibers within the V-form groove. In view of the V-form groove being unitary to the rod, accurate and precise machining of the V-form groove is not particularly critical. However, precise positioning of the fibers and maintenance of the fibers within the V-form groove of the rod during assembly of the connector, are required.

The connector according to the present invention employs a V-form groove to facilitate alignment and positioning of the ends of fibers to be joined. The V-form groove is formed in a unitary barrel structure to alleviate the need for accurate and precise machining of the groove. Means are provided to accomplish threading of the fibers into the groove and proper centering or positioning of the fibers longitudinally relative to the barrel. The fibers are joined into the connector one at a time substantially independent of each other.

The connector uses an elongate positioning barrel having a recess disposed in its outer surface and extending longitudinally the length of the barrel to define a track. In the bottom of the recess or track is a continuous V-form groove defining identical positioning means along the barrel for the respective fibers to be joined. The groove of each positioning means includes distinct first, second and third alignment portions. The positioning means are disposed in end-to-end relation to each other longitudinally of the barrel. The first alignment portions are rectilinear and disposed end-to-end in coaxial alignment. The second alignment portions are proximate opposite ends of the barrel for receiving the fibers. The third alignment portions join the first and second alignment portions at an angle to create a biasing stress on the fibers. The cross section of the fibers is only partially received in the V-form groove in the first alignment portion but fully in the second and third alignment portions. A clamping plate structure is provided in superimposed relation to the open side of the V-form groove. The clamping plate structure is detachably secured in place to wedge or maintain the fibers in the desired interfacing position.

Some of the objectives of the invention having been stated, other objects will appear as the description proceeds when taken in connection with the accompanying drawings, in which.

Figure 1:
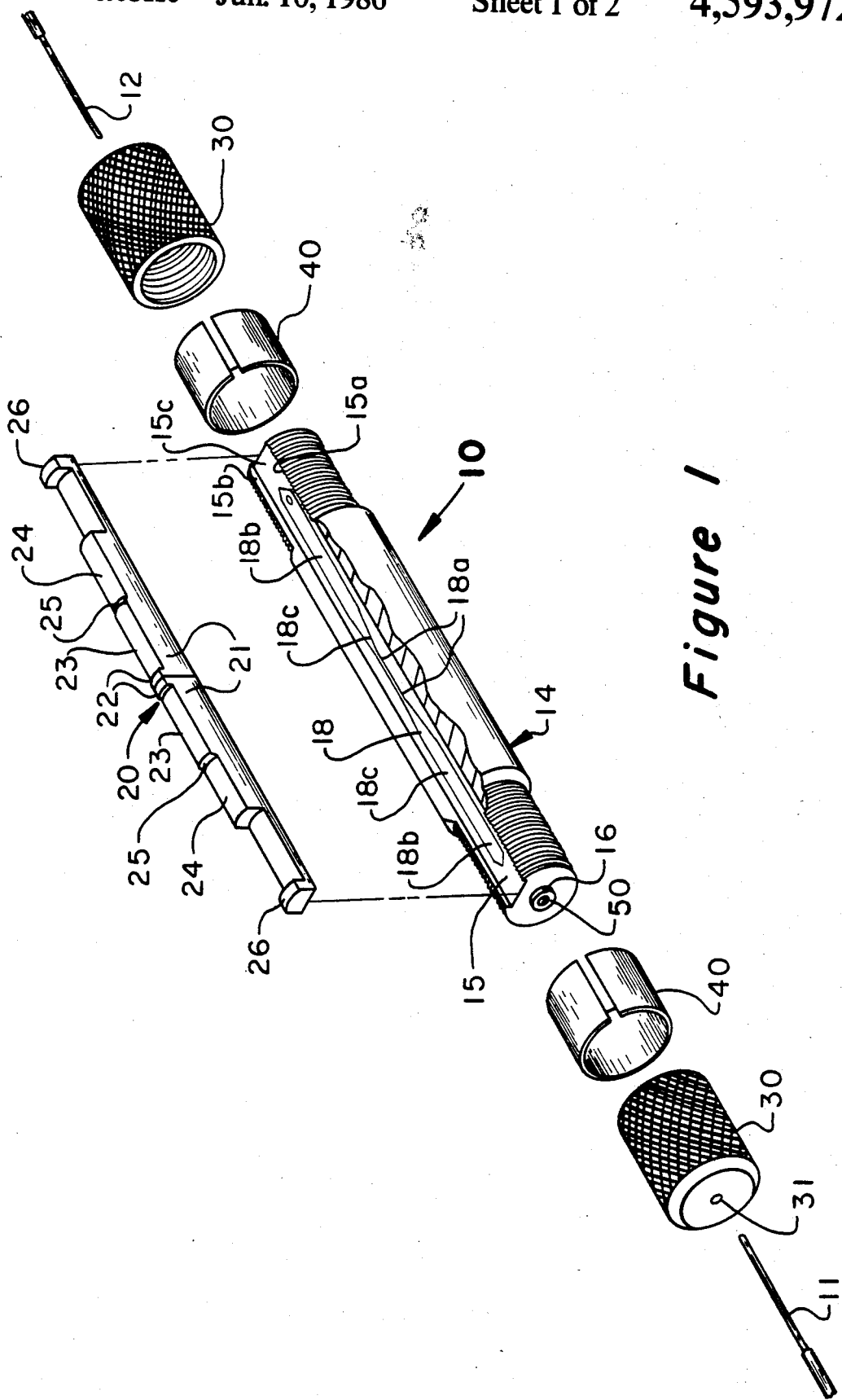
FIG. 1 is an exploded fragmentary view of a connector constructed in accordance with the present invention.

Referring more specifically to the drawings wherein like reference characters are used to indicate like parts, there is shown in FIG. 1, in exploded and fragmentary form, a connector, generally designated at 10, of the present invention for detachably joining the ends of a pair of optical fibers 11 and 12 in abutting and coaxial alignment for optical signal transmission. The fibers 11 and 12 are normally encased with a protective coating. The coating is preferably stripped from end portions of the fibers 11 and 12 to be connected. Alignment of the optical signal transmitting portions of the fibers does not then suffer from differences in thickness of the protective coating.

The connector 10, as best illustrated in FIG. 1, comprises an elongate positioning barrel 14 of generally cylindrical shape and is formed of a material such as aluminum that does not interfere with the optical transmitting qualities of the fibers 11 and 12. The barrel 14 includes a channel or recess of U-shaped cross section in the outer surface of the cylindrical barrel 14 and extends longitudinally throughout the length of the barrel 14 to define a track 15. The track 15 includes spaced and planar side surfaces 15a and 15b and planar bottom surface 15c. The top of the track 15 is open. At opposite ends of the barrel 14, countersunk aperatures or openings 16 are disposed inwardly along the longitudinal axis of the barrel 14. The openings 16 openingly communicate with a V-form groove 18 disposed in the bottom surface 15c of track 15. More specifically, the V-form groove 18 extends radially inward from the bottom surface 15c of track 15 toward the longitudinal axis of the barrel 14.

The V-form groove 18 is continuous along the length of the barrel 14 from its open communication with openings 16. The V-form groove 18 defines identical fiber positioning means adjacent each other longitudinally of the barrel 14 for receiving the fibers to be connected, respectively. The V-form groove 18 includes first, second and third alignment portions 18a, 18b, 18c, respectively. The first alignment portions 18a are located centrally of the barrel 14 and in end-to-end relation with each other. The cross section of the first alignment portions 18a are identical and of a size and shape to only partially receive the fibers to be connected with a portion of the fibers projecting beyond the bottom surface 15c of track 15. The first alignment portions 18a are rectilinear, coaxial and parallel to the longitudinal axis of the barrel 14.

The second alignment portions 18b are disposed proximate opposite ends of the barrel 14 and in open communication with the openings 16. The first and second alignment portions 18a and 18b are interconnected by a third alignment portion 18c which is curvilinear with its open side forming a dihedral angle relative to the open sides of the second alignment portions 18b. The cross section of the second and third alignment portions 18b and 18c are of a size and shape to fully receive the fibers to be connected.

The first, second and third alignment portions 18a, 18b and 18c define identical positioning means for the respective fibers 11 and 12 to be connected. The positioning means are in end-to-end relation and in a common plane that passes through the longitudinal axis of barrel 14.

The V-form groove 18 can and is preferably formed in one continuous machining operation. The bottom surface 15c of track 15 is first machined or otherwise formed to have the general contour to be taken by the V-form groove. Then, a cutting tool with the desired V-form cutting edge is inserted in the bottom surface 15c of track 15 near one end of the barrel 14 and rotated about an axis normal to the longitudinal axis of the barrel 14 so as to cause the cutting tool to cut an arcuate V-form that intersects with the opening 16 in barrel 14. The cutting tool is moved longitudinally relative to the barrel 14 with the cutting depth of the cut progressively diminishing to a depth desired for the first alignment portion 18a of the V-form groove 18. The cutting tool is then moved along a rectilinear path parallel to the longitudinal axis toward the other end of the barrel 14, while holding the cutting depth of the tool, the combined distance of the first alignment portions 18a of each positioning means. The cutting tool is progressively inserted further into the barrel 14 as it is moved longitudinally of the barrel 14 in the same direction to define the third alignment portion 18c of the other positioning means. The ending depth of the cutting tool in cutting the third alignment portion should be near the central axis of the barrel 14. The cutting tool is then rotated about an axis normal to the longitudinal axis of the barrel 14 toward the end of the barrel 14. The cutting tool should intersect with the opening 16 in the end of the barrel 14. Preferably, there should be no sharp discontinuities in the V-form groove 18 which would create high stress in the fibers 11 and 12 to be received within the groove 18.

The external cylindrical surface of the opposite end portions of the barrel 14 are of reduced diameter relative to the central part of barrel 14. The reduced ends are threaded.

A clamping plate structure 20, as best shown in FIG. 1, is provided for receipt within the recess or track 15 of barrel 14. The clamping plate structure 20 comprises a pair of elongate plates 21 matingly received within the track 15 in end-to-end relation. The plates 21 are of identical construction and together are approximately the same length as the barrel 14. One end of the plates 21 abut at the center of the elongate axis of the barrel 14. The plates 21 are restricted from movement transversely relative to the track 15 by the sides of the track 15 but are free to slide longitudinally within the track 15 relative to the barrel 14. The plates 21 include upstanding flanges or stops 22, respectively, at ends of plates 21 in abutting relation. The stops 22 project slightly beyond the diameter of the barrel 14.

The thickness of plates 21 is distinct in three regions along its length. The regions 23 adjacent the stops 22 have a thickness greater than the depth of track 15 of barrel 14. The outer surface of regions 23 are arcuate shaped. These regions will be referred to as the clamping regions. Next to the clamping regions 23 are non-clamping regions 24. The outer surfaces of the non-clamping regions 24 are also arcuate. The thickness of regions 24 is slightly less than the depth of track 15 of barrel 14. The clamping and non-clamping regions are interconnected by a beveled surface 25, respectively, which provides for a fairly smooth transmission between the clamping and non-clamping regions 23 and 24. The remainder of the plates 21 are of reduced thickness relative to regions 23 and 24 and are fully received within the track 15. The remote ends of plates 21 have a flange 26, respectively, that projects radially outward but still remains fully within the track 15.

Cylindrical lugs 30 are threadably received on opposite ends of the barrel 14. The lugs 30 include openings 31 in the ends thereof for passage of fibers 11 and 12 with the openings 31 communicating with the openings 16 in the barrel 14. The lugs 30 have an enlarged cylindrical cut out 32, respectively, inwardly of the threaded portion for receiving flanges 26 of plates 21. The length of the cut outs 32 is substantially the same as the length of the flanges 26. The flanges 26 will be received in the cut outs 32, respectively, as the lugs 30 are received on the barrel 14. As a lug 30 is threaded on the end of barrel 14, the lug 30 engages region 24 of plate 21 and forces plate 21 toward the center of the barrel 14. The barrel 14, plates 21, and lugs 30 cooperate so that when the lugs 30 are tight, the plates 21 are centered relative to the longitudinal axis of barrel 14 and in abutting relation.

A split cylindrical spring 40 is provided for each of the plates 21. The springs 40 are received circumferentially of the barrel 14 and plates 21. The springs 40 have an internal diameter in the relaxed or unstressed condition slightly less than the diameter of the barrel 14 so that the spring does not move freely along the longitudinal axis of the barrel 14.

Movement of the springs 40 longitudinally of the barrel 14 is restricted in one direction by stops 22 of the plates 21, and in the other direction by the lugs 30. Otherwise, the springs 40 can be slipped longitudinally relative to the barrel 14. The primary clamping action is provided when the springs 40 are in the clamping position, regions 23, relative to the plates 21.

Figure 2:
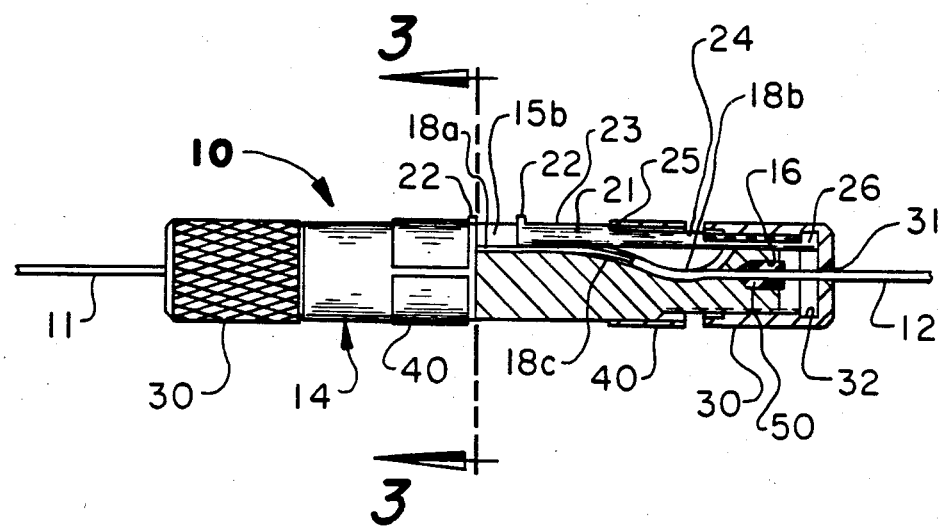
FIG. 2 is an elevational view with portions in section of a partially assembled connector constructed in accordance with the present invention.

Reference is made to FIG. 2 for a better understanding of operation of the connector 10. FIG. 2 illustrates fiber 11 already installed and fiber 12 being installed. The protective coating is removed from the end of fiber 12 at least the length to be received in the first alignment portion 18a of groove 18. The end of fiber 12 is cut transversely to insure a good cleavage. Commercially available cleaving tools may be used. The plate 21 is inserted into track 15 but not in abutting relation to the other plate 21 whereby its end extends beyond the end of barrel 14. The lug 30 is placed over the projecting end of plate 21 with flange 26 received in the enlarged cut out 32 of lug 30. Lug 30 is threaded an initial amount onto the barrel 14. Further assembly of the connector 10 will only require threading of lug 30 into a tightening position to clamp fiber 12. Fiber 12 is inserted or threaded through the opening 31 of the lug 30 into opening 16 of the barrel 14 where communication is made with the V-form groove 18. The fiber 12 is continually moved longitudinally toward the center in sequence through the alignment portions 18b, 18c and 18a of the V-form groove 18. As the fiber 12 is advanced, the angle between the second and third alignment portions 18b and 18c creates a biasing stress on the fiber 12 to hold the fiber 12 in the third alignment portion 18c. The fiber 12 is continued to be advanced until it abuts adjacent plate 21. Now the lug 30 is threaded on the remainder of the way until tight. As the lug 30 is threaded on, the plate 21 moves into position. The fiber 12 will tend to extend beyond the first alignment portion 18a. However, as plate 21 moves into position, its lower surface will engage fiber 12 and force it into the first alignment portion 18a of V-form groove 18. During this operation the spring 40 should be positioned adjacent lug 30 so that it will not be in its greatest clamping position. Once the lug 30 is tightly secured, the spring 40 is slid toward the center to abut the stop 22 of plate 21. The spring 40 provides a clamping action clamping the fiber 12 between the plate 21 and barrel 14 with the fiber 12 in the V-form groove 18 and its end at the longitudinal center of barrel 14 in abutting and coaxial alignment with fiber 11 in the other end of the connector 10.

It has been found desirable that the fibers 11 and 12 also be secured at or near their point of entry into the barrel 14. However, it will be appreciated that this cannot be done until the fiber has been fully inserted to its centering position relative to the barrel 14. In the embodiment of the invention shown in FIG. 1 and FIG. 2, this can be accomplished by an elastomeric or rubber annular bushing 50 that is received in the opening 16 of barrel 14. The bushing 50 should normally project a small distance beyond the end of barrel 14. As the lug 30 is tightened it will engage and compress the bushing 50 within the opening 16. The compression will cause the bushing to displace and secure the fiber 12. Other similar approaches may be used.

Figure 3:
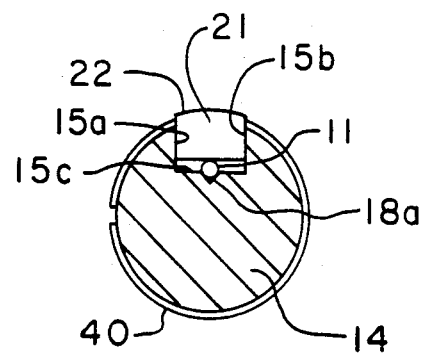
FIG. 3 is an enlarged sectional view taken substantially along the line 3—3 of FIG. 2.

From the above description for positioning fiber 12 it will be apparent that the same process is used for assembly of fiber 11. Reference is made to FIG. 3 showing the relation of fiber 11 to barrel 14, the V-form groove 18, the plate 21 and spring 40. When one fiber is being positioned, the plate 21 and lug 30 of the other end of the connector should be in position as though securing a fiber. The plate 21 of one side of the connector serves as a centering guide for assembly of the fiber in the other side of the connector.

In the drawings and specifications there has been set forth a preferred embodiment of the invention, and although specific terms are employed, they are used in a generic and descriptive sense only and not for purposes of limitation.

I claim:

1. A connector for detachably joining the ends of a pair of optical fibers in abutting and coaxial alignment comprising
    an elongate positioning barrel having a continuous longitudinal V-form groove therein defining identical positioning means disposed in end-to-end relation to each other longitudinally of said barrel for each of said fibers, said groove including first rectilinear alignment portions disposed adjacent each other and in coaxial alignment, second alignment portions disposed proximate opposite ends of said barrel for receiving said fibers, and third alignment portions interconnecting said first and second alignment portions, said first, second and third alignment portions being disposed in the same plane with said third alignment portions being at an angle relative to said first and second alignment portions such that when the fiber is advanced in said second alignment portion and moved longitudinally of the barrel toward said first alignment portion, the fiber's end is held in said third alignment portion of said groove by a biasing stress on the fiber, the cross section of said V-form groove in the first rectilinear alignment portions being of a size and shape to only partially receive said fibers with a portion of said fibers projecting beyond said groove,
    an elongate clamping plate means disposed adjacent said barrel in superimposed relation to the open side of said V-form groove and
    means for detachably securing said clamping plate means against the open side of said V-form groove for clamping said fibers within said first alignment portions of said groove to maintain coaxial alignment between said fibers.

2. A connector as in claim 1 wherein said third alignment portions of said V-form groove are curvilinear with the open sides of said third alignment portions forming a dihedral angle relative to the open sides of said second alignment portions.

3. A connector as in claim 1, wherein the cross section of said V-form groove in said second and third alignment portions is capable of fully receiving the cross section of said fibers and progressively diminishes in and along said third alignment portions into said first rectilinear alignment portions to a cross section to only partially receive the cross section of said fibers.

4. A connector as in claim 1 wherein said barrel includes a recess extending longitudinally therein with said V-form groove being disposed in the bottom of said recess and wherein said elongate clamping plate means comprises a pair of elongate plates received in end-to-end relation within the recess of said barrel, said recess limiting movement of said plates transversely.

5. A connector as in claim 4 wherein said means for detachably securing said plates to said barrel comprise separate resilient retaining means for each of said plates.

6. A connector as in claim 5 wherein each of said resilient retaining means are movable relative to said barrel and the clamping plate associated with said resilient retaining means between a clamping and nonclamping position.

7. A connector as in claim 4 including lugs detachably received on opposite ends of said barrel, said lugs having openings therein for receiving said fibers in open communication with said second alignment portions of said V-form groove, said lugs operatively engaging said plates for positioning of said plates longitudinally relative to said barrel in end-to-end relation.

8. A connector for detachably joining the ends of a pair of optical fibers in abutting and coaxial alignment comprising an elongate positioning barrel, said barrel having a recess disposed in the outer surface thereof and extending longitudinally the length of said barrel to define a track, the bottom of said track having disposed therein a continuous, longitudinal V-form groove defining identical positioning means disposed in end-to-end relation longitudinally of said barrel for each of said fibers, said groove including first rectilinear alignment portions disposed adjacent each other and in coaxial alignment, second alignment portions disposed proximate opposite ends of said barrel for receiving fibers, and third alignment portions interconnecting said first and second alignment portions, said alignment portions being disposed in the same plane with the open sides of said third alignment portions forming a dihedral angle relative to the open sides of said second alignment portions, said fibers being held in said third alignment portions of said groove by a biasing stress created on the fibers as the fibers are advanced from said second alignment portions along said groove, the depth of said V-form groove progressively diminishing in and along said third alignment portions into said first rectilinear alignment portions, the cross section of said V-form groove in the first rectilinear alignment portions being of a size and shape to only partially receive said fibers with a portion of said fibers projecting beyond said groove, a pair of elongate clamping plates received in the recess track of said barrel, said track limiting movement of said plates transversely while permitting longitudinal movement of said plates within said track, lugs detachably received on opposite ends of said barrel, said lugs having openings therein for receiving said fibers in open communication with said second alignment portions of said V-form groove, said lugs operatively engaging said plates and positioning said plates longitudinally relative to said barrel in end-to-end relation, and a pair of resilient retaining means for detachably securing said plates against the open sides of said V-form groove in said barrel for holding said fibers within said first alignment portions of said groove to maintain coaxial alignment between said fibers.

9. A connector as in claim 8 wherein said resilient retaining means comprise sleeve springs disposed about said barrel and associated plates, said plates having defined therein clamping and non-clamping positions for said sleeve springs with said sleeve springs being movable relative to said plates between the clamping and non-clamping positions.

* * * * *